Patented Aug. 17, 1948

2,447,196

UNITED STATES PATENT OFFICE 2,447,196

DIAMIDES OF METHANE-1:1-DICARBOXYLIC ACIDS

Henry Martin and Hans Gysin, Basel, Hans Zaeslin, Riehen, near Basel, and Alfred Margot, Basel, Switzerland, assignors to J. R. Geigy A. G., Basel, Switzerland, a Swiss firm No Drawing. Original application October 15, 1943, Serial No. 506,418. Divided and this application February 28, 1947, Serial No. 731,720. In Switzerland December 18, 1942

4 Claims. (Cl. 260—557)

This is a divisional patent application of our copending patent application Ser. No. 506,418 filed on October 15, 1943.

It has been found that amides deriving from substituted malonic acids and from secondary aliphatic and cycloaliphatic amines respectively containing at least 3 C-atoms constitute very valuable therapeutical compounds. As substituents being present in the methylene group of the malonic acid there come into question: alkyl, alkenyl, alkylene, alkylidene; cycloalkyl, cycloalkenyl and cycloalkylidene radicals. The cycloalkyl and cycloalkenyl radicals may be linked directly to the methylene group or by means of an aliphatic linking member.

As substituted malonic acids we may use for instance: dimethyl malonic acid, methyl ethyl malonic acid, diethyl malonic acid, allyl methyl malonic acid, propyl methyl malonic acid, isopropyl methyl malonic acid, isopropenyl methyl malonic acid, isopropylidene malonic acid; cyclohexyl-, cyclohexylmethyl-, cyclohexenyl-, cyclopentylidene-malonic acid; cyclopropane-, -butane-, -pentane-, -hexane-1:1-dicarboxylic acid.

The new malonic acid diamides disubstituted in the amide radical are obtained by causing a malonic acid of the above definition or a functional derivative thereof, such as for example a halide or an ester, to react according to known methods with secondary aliphatic or cycloaliphatic amines containing at least 3 C-atoms or their salts, in the presence or absence of solvents, of condensation agents as well as of acid binding agents.

As condensation agents there are advantageously used phosphorus halides, phosphorus pentoxide, thionyl chloride, phosgene and so on.

Another method consists in that the salts of the above defined malonic acids are caused to react with such carbamic acid halides which derive from secondary aliphatic or cycloaliphatic amines containing at least 3 C-atoms. Moreover in certain cases it will be possible to start from the amides of the unsubstituted malonic acid, and to substitute the C-substituents into the methylene group of the malonic acid. The missing substituents may also subsequently be introduced into amides which have been prepared by means of primary amines or ammonia instead of with secondary amines (cf. Titherley J. Chem. Soc. London 79, 391, 1901).

The new compounds may be used as valuable therapeutics, especially as analeptics; partly they are also suitable as solving assistants.

The present invention is illustrated, but not limited by the following examples, wherein the parts are by weight, unless otherwise stated. Parts by weight bear the same relation to parts by volume as do grams to cubic centimeters.

EXAMPLE 1

158 parts of methyl isopropenyl malonic acid are treated with 417 parts of phosphorus pentachloride and the whole is heated to 50° C. After completion of the reaction the phosphorus oxychloride is removed and the carboxylic acid chloride distilled, B. P. 75°–80° C. at 15 mm. Then the acid chloride is allowed to drop while well cooling into a little excess of diethylamine in dry ether. The diethylamine hydrochloride thus separated is filtered by suction and the residue after having expelled the solvent is freed from remaining diethylamine hydrochloride by means of potassium hydroxide or of potassium carbonate and finally rectified in high vacuo. The obtained methyl isopropenyl malonic acid bis-diethylamide has a boiling point of 109–110° C. at 0.12 mm. pressure. When recrystallized from petroleum ether the new amide melts at 48°–49° C.; it is soluble in water for about 4 per cent, but easily soluble in ether.

EXAMPLE 2

21.5 parts of malonic acid bis-diethylamide are heated to 80° C. with 39 parts of sodium amide in xylol, then cooled and again heated for several hours under reflux with 14.8 parts of n-propylbromide. The reaction mixture is then poured on ice and the n-propyl malonic acid bis-diethylamide thus formed is precipitated by means of potassium carbonate. In high vacuo at a pressure of 0.12 mm. it boils at 137°–138° C. It is miscible with water and organic solvents.

Alkyl-n-propyl malonic acid bis-diethylamides may be produced as mentioned in the above example or by ethylation of alkyl-n-propyl malonic acid diamides according to Titherley (loc. cit.).

According to the same methods of working the compounds enumerated in the following table can be prepared.

Table 1

Malonic acids R⟨COOH / COOH⟩

| No. | R | amine | B. P. (mm.) | form | solubility in: w=water e=ether |
|---|---|---|---|---|---|
| 1 | C₂H₅–CH⟨ / CH₃ | HN(C₂H₅)₂ | 128–130° C. (0.1) | liquid | w miscible, e easily soluble. |
| 2 | CH₃–C(CH₃)– with CH₃ | ---do--- | 108°–109° C. (0.25) | solid M. P. 61° C | w easily soluble, e easily soluble. |
| 3 | CH₃–C(C₂H₅)– with CH₃ | ---do--- | 111°–112° C. (0.12) | liquid | w 10% soluble, e easily soluble. |
| 4 | (CH₃)₂CH–CH⟨ | ---do--- | 118–120° C. (0.3) | ---do--- | w miscible, e miscible. |
| 5 | (CH₃)₂C=C(CH₃)– | ---do--- | 113°–114° C. (0.33) | solid M. P. 42°–43° C. | w easily soluble, e easily soluble. |
| 6 | (C₂H₅)₂C⟨ | HN(CH₃)(C₂H₅) | 113–115° C. (0.28) | liquid | w easily soluble, e easily soluble. |
| 7 | (CH₃CH₂)₂C⟨ | NH(C₂H₅)₂ | 121–122° C. (0.25) | ---do--- | w 5% soluble, e easily soluble. |
| 8 | CH₃(CH₂)₂–C(CH₃)⟨ | ---do--- | 124–125° C. (0.25) | ---do--- | w 2% soluble, e easily soluble. |
| 9 | (CH₃)₂CH–C(CH₃)⟨ with CH₃ | HN(C₂H₅)₂ | 115–116° C. (0.15) | ---do--- | w 2% soluble, e easily soluble. |
| 10 | CH₂=CH–CH₂–C(CH₃)⟨ | ---do--- | 119–121° C. (0.1) | ---do--- | w 3–4% soluble, e easily soluble. |
| 11 | (CH₃)₂C(CH₂)–, CH₂=  | HN(CH₂–CH=CH₂)₂ | 123–125° C. (0.1) | ---do--- | w difficultly soluble, e easily soluble. |
| 12 | (C₂H₅)(CH₃)C=C⟨ | HN(C₂H₅)₂ | 125–128° C. (0.25) | ---do--- | w soluble, e soluble. |
| 13 | CH₂=CH–CH₂–C(C₂H₅)⟨ | ---do--- | 128–130° C. (0.3) | ---do--- | w 3% soluble, e easily soluble. |
| 14 | (CH₂=CH–CH₂)(C₂H₅)C⟨ | HN[CH(CH₂CH₂)₂]₂ | 150–151° C. (0.1) | ---do--- | w scarcely soluble, e easily soluble. |
| 15 | (CH₂=CH–CH₂)₂C⟨ | HN(C₂H₅)₂ | 152–154° C. (1) | ---do--- | w difficultly soluble, e easily soluble. |
| 16 | cyclopentyl–CH< | ---do--- | 138–140° C. (0.4) | solid M. P. 64° C | w easily soluble, e easily soluble. |

Table 1—(Continued)

| No. | R | amine | B. P. (mm.) | form | solubility in: w=water e=ether |
|---|---|---|---|---|---|
| 17 | CH₂—CH₂\CH₂—CH₂/C=C< (cyclopentylidene) | $HN(C_2H_5)_2$ | 128° C. (0.28) | liquid | w 5% soluble, e soluble. |
| 18 | cyclohexylidene with CH₃ | do | 140–142° C. (0.1) | do | w difficultly soluble, e soluble. |
| 19 | cyclopentyl-CH-CH₂-CH structure | do | 135–138° C. (0.2) | do | w soluble, e easily soluble. |
| 20 | CH₃\C<\CH₃ (dimethyl) | do | 115–117° C. (0.28) | do | w miscible, e easily soluble. |
| 21 | CH₂—CH₂\CH₂—CH₂/C< (cyclopentyl) | do | 128–130° C. (0.1) | do | w moderately soluble, e easily soluble. |

What we claim is:

1. The bis-diethyl amide of methyl-isopropenyl malonic acid of the formula

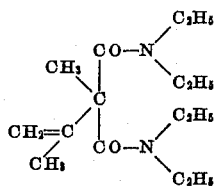

being a white crystallised solid of the melting point 48°–49° C.

2. The bis-diethyl amide of dimethyl malonic acid of the formula

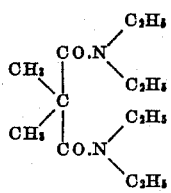

being a white crystallised solid of the melting point 61° C.

3. The bis-diethylamide of the formula

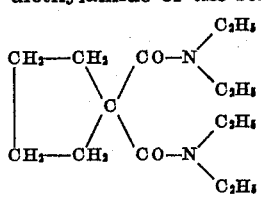

4. A dicarboxylic acid diamide of the formula

wherein X represents a methylene radical containing 3 to 8 carbon atoms and selected from the group consisting of dialkyl-methylene, alkyl-alkenyl-methylene, dialkenyl-methylene, cycloalkyl-alkyl-methylene, cycloalkenyl-alkyl-methylene, alkylene-methylene, alkylidene-methylene and cyclo-alkylidene-methylene radicals, and Am represents an N-dialkylamino radical containing 3 to 6 carbon atoms.

HENRY MARTIN.
HANS GYSIN.
HANS ZAESLIN.
ALFRED MARGOT.

REFERENCES CITED

The following references are of record in the file of this patent:

UNITED STATES PATENTS

| Number | Name | Date |
|---|---|---|
| 1,986,854 | Reid | Jan. 8, 1935 |
| 2,182,178 | Pinkernelle | Dec. 5, 1939 |
| 2,192,906 | Hanford et al. | Mar. 12, 1940 |

FOREIGN PATENTS

| Number | Country | Date |
|---|---|---|
| 358,085 | France | Jan. 26, 1906 |

OTHER REFERENCES

West, "J. Chem. Soc." (London), vol. 125 (1924), pages 710–721.
Naik et al., "Chemical Abstracts," vol. 26 (1932), page 93.
Kennedy, "J. Chem. Soc." (London) (1932), pages 2781–2782.
Bush, "J. Am. Chem. Soc." vol. 61 (1939), pages 637–638.